United States Patent
Larosa et al.

(10) Patent No.: US 7,639,621 B1
(45) Date of Patent: Dec. 29, 2009

(54) METHOD AND APPARATUS FOR ANALYZING SOURCE INTERNET PROTOCOL ACTIVITY IN A NETWORK

(75) Inventors: Jeanette Larosa, Kingston, NJ (US); Chaim Spielman, Spring Valley, NY (US)

(73) Assignee: AT&T Corp., New York, NY (US)

( * ) Notice: Subject to any disclaimer, the term of this patent is extended or adjusted under 35 U.S.C. 154(b) by 723 days.

(21) Appl. No.: 11/323,011

(22) Filed: Dec. 30, 2005

(51) Int. Cl.
  *G01R 31/08* (2006.01)
  *H04L 12/66* (2006.01)
  *G06F 15/16* (2006.01)
  *G06F 9/00* (2006.01)

(52) U.S. Cl. .................. 370/241; 370/352; 709/203; 726/14

(58) Field of Classification Search .......... 370/241, 370/244, 245, 252, 389, 352; 709/203, 219, 709/224, 229; 726/6, 11, 13, 14, 15, 23, 726/28, 30, 22, 1
See application file for complete search history.

(56) References Cited

U.S. PATENT DOCUMENTS

| | | | | |
|---|---|---|---|---|
| 5,787,253 | A | * | 7/1998 | McCreery et al. ........... 709/231 |
| 7,376,969 | B1 | * | 5/2008 | Njemanze et al. ............ 726/22 |
| 7,484,097 | B2 | * | 1/2009 | Steiger et al. .............. 713/176 |

* cited by examiner

*Primary Examiner*—Hanh Nguyen

(57) ABSTRACT

Method and apparatus for analyzing source internet protocol (SIP) activity in a network is described. In one example, a SIP address is obtained. Log data collected over a predefined time period by a plurality of network facilities is automatically queried using the SIP address as parametric input to generate a report. The report includes sample activity for the SIP and statistics for targeted network facilities, firewall activity, targeted network spaces, and targeted IP addresses.

6 Claims, 3 Drawing Sheets

METHOD AND APPARATUS FOR ANALYZING SOURCE INTERNET PROTOCOL ACTIVITY IN A NETWORK

BACKGROUND OF THE INVENTION

1. Field of the Invention

Embodiments of the present invention generally relate to network monitoring and, more particularly, to a method and apparatus for analyzing source internet protocol (IP) activity in a network.

2. Description of the Related Art

Networks typically monitor for abnormal activities that may suggest some type of malicious attack is underway. When an event takes place an alarm is generated and a review of the activity leading to the event begins. One type of activity (that is reviewed) is internet Protocol (IP) activity emanating from a host computer. Each computer is identified by the Source IP Address (SIP). A review of SIP activity also includes actions taken by various network elements in the network in response to requests from the host identified with the SIP. Conventionally, SIP activity is reviewed manually by a network security analyst. The network security analyst typically chooses to manually execute queries to explain the abnormal SIP activity, such as port sweeping and scanning. However, such manual processing of log data is time consuming. By the time a network security analyst detects abnormal activity, the security of the network may be compromised, resulting in the loss or exposure of sensitive information and the ability of the network to function. Accordingly, there exists a need in the art for an improved method and apparatus for analyzing SIP activity in a network.

SUMMARY OF THE INVENTION

Method and apparatus for analyzing source internet protocol (SIP) activity in a network is described. In one embodiment, a SIP address is obtained. Log data collected over a predefined time period by a plurality of network facilities is automatically queried using the SIP address as parametric input to generate a report. The report includes sample activity for the SIP and statistics for targeted network facilities, firewall activity, targeted network spaces, and targeted IP addresses. By generating the report automatically, the time it takes to run queries as part of SIP analysis is reduced, allowing a network analyst to quickly identify actions to be taken (e.g., further analysis, mitigation, escalation).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
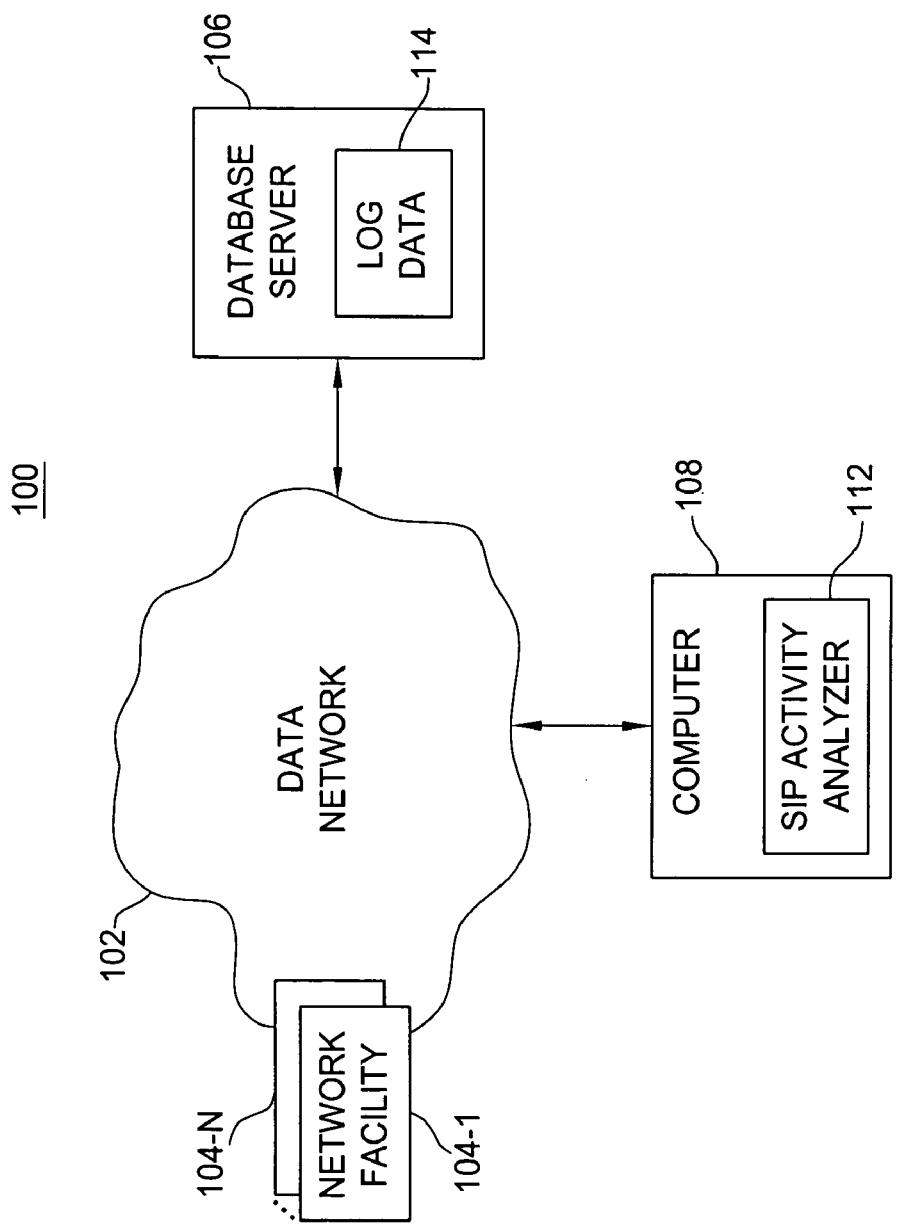
FIG. 1 is a block diagram depicting a network architecture in accordance with one or more aspects of the invention.

FIG. 1 is a block diagram depicting a network architecture 100 in accordance with one or more aspects of the invention. The network architecture 100 illustratively includes a network 102, network facilities 104-1 through 104-N (collectively referred to as network facilities 104), a database server 106, and a computer 108 (where N is an integer greater than zero). The network 102 comprises a packet network configured to propagate packets in accordance with a particular network protocol, such as internet protocol (IP), and transport protocol, such as transmission control protocol (TCP), user datagram protocol (UDP), and the like.

The network facilities 104 include routers, firewalls, proxy servers, web servers, and like type network devices known in the art. The network facilities 104 are configured to generate log data, which are exported to the database server 106. The log data for a network element includes entries that list actions that have occurred with respect to the network facility. The entries include information associated with actions, such as source IP address, target IP address, source port/protocol, target port/protocol, user identifier (ID), a message indicating result of the action, and like type log parameters known in the art.

The database server 112 is configured to collect log data 114 from the network facilities 104 in the network 102. The log data 114 includes events associated with log entries produced by the network facilities 104. The log data 114 may be collected periodically. Older data may be expunged from the database server 112 after a predefined time period. Each of the network facilities 104 may produce log data having a different format. The log data from the network facilities 104 may be normalized before being stored by the database server 106. That is, each event maintained by the database server 112 may have predefined fields. For example, each event may include fields for date/time, facility, source IP address, facility IP address, target IP address, protocol, source port, target port, type of action, message, and interface. The database server 106 may implement any database platform known in the art.

The computer 108 is configured to implement a source IP (SIP) activity analyzer 112. The SIP activity analyzer 112 is executed using an input SIP address. For example, the SIP address may be input by a network security analyst. Alternatively, the SIP activity analyzer 112 may automatically process a SIP address from a file having a list of SIP addresses to be processed. In either case, the SIP activity analyzer 112 automatically queries the log data 114 in the database server 106 within a predefined time window using the SIP address as parametric input. The SIP activity analyzer 112 automatically generates a report having sample activity for the SIP address within the network, as well as various statistics for targeted network elements, firewall activity, targeted network spaces, and targeted IP addresses. In one embodiment, the SIP activity analyzer 112 is triggered in response to an alarm generated within the network. In such an embodiment, the SIP activity analyzer 112 receives the alarm identifier and time period of the alarm in addition to the SIP address.

The report produced by the SIP activity analyzer 112 may be displayed to a network operator on a display 109 using, for example, a graphical user interface (GUI). In another embodiment, a link to the results of the SIP activity analyzer 112 (e.g., a hyperlink) is stored within an alarm entry, which is then displayed on the GUI. When viewing the alarm entry, a network operator may access the results of the SIP activity analyzer 112 via the link. Operation of the SIP activity analyzer 112 is described below. Those skilled in the art will appreciate that the network architecture 100 is merely illustrative and that the SIP activity analyzer 112 may be employed in a myriad of network architectures. In general, the SIP activity analyzer 112 is configured to process log data produced by various network facilities using input SIP addresses and produce reports including statistics for the SIP addresses.

Figure 2:
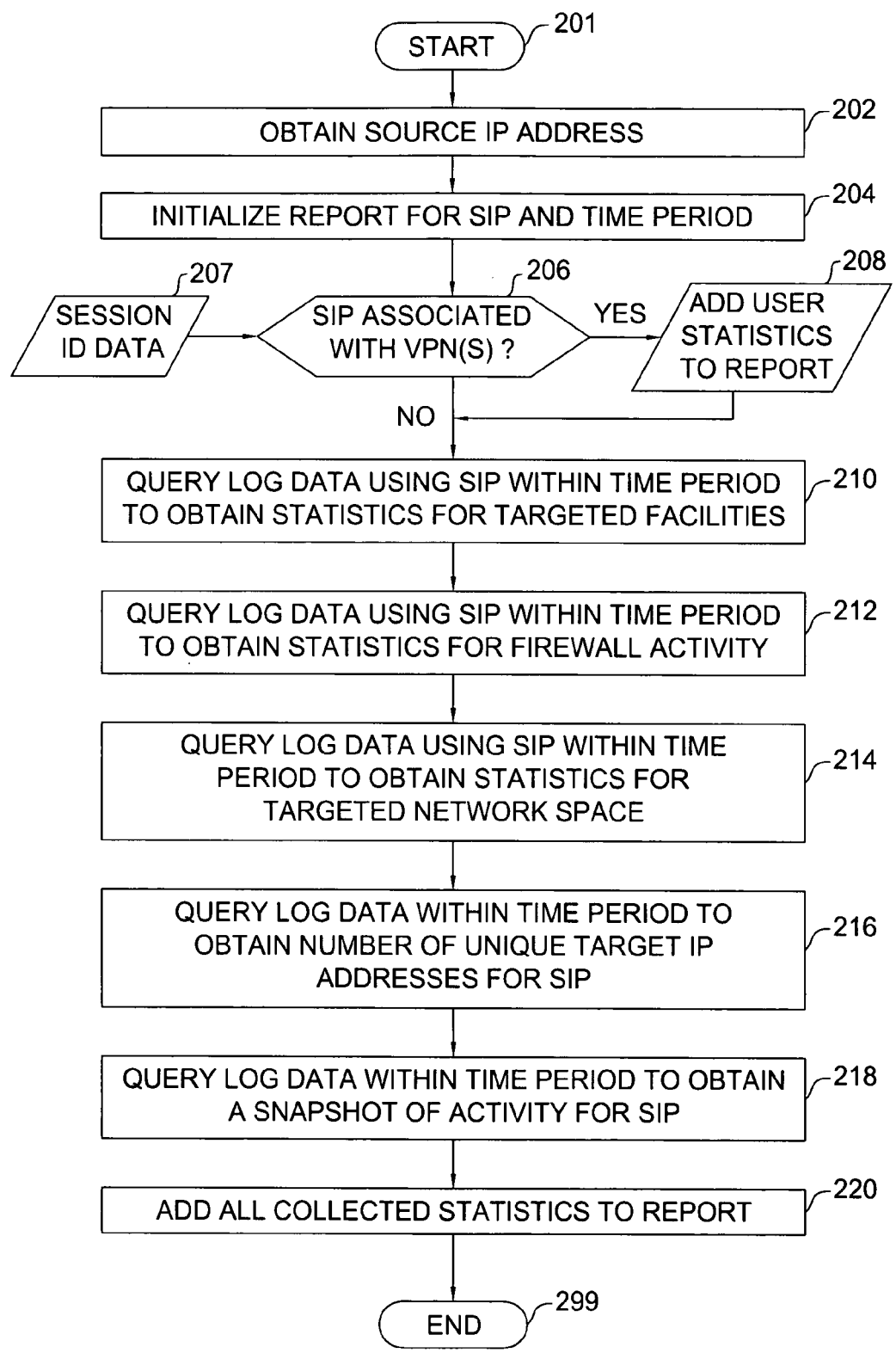
FIG. 2 is a flow diagram depicting an exemplary embodiment of a method for analyzing SIP activity in a network in accordance with one or more aspects of the invention.

FIG. 2 is a flow diagram depicting an exemplary embodiment of a method 200 for analyzing SIP activity in a network in accordance with one or more aspects of the invention. The method 200 may be performed by the SIP activity analyzer 112 of FIG. 1. The method 200 begins at step 201. At step 202, a SIP address is obtained as input. The SIP address may be obtained from a network operator, or from a file of SIP addresses to be processed. At step 204, a report for the SIP address is initialized for the SIP address and a particular time period. As discussed below, multiple queries are made on log data collected from various network facilities to obtain various statistics associated with the SIP address. The report is generated for the SIP address and contains statistics associated with a particular time window within the log data. The time period is referred to as the analysis period.

At step 206, a determination is made whether the SIP address is associated with any session identifiers. Exemplary session identifiers include virtual private network (VPN) session identifiers or dynamic host control protocol (DHCP) session identifiers. Notably, a particular SIP address may be assigned to multiple users within the analysis period (i.e., a SIP address may be used for multiple sessions). Each of the sessions is assigned a particular identifier by the network. Session identifier data 207 may be analyzed to derive session identifiers for the SIP address. If the SIP address is associated with any session identifiers, the method 200 proceeds from step 206 to step 208, where user statistics are added to the report. Each session identifier is associated with a particular user. The user statistics added to the report may include, for each user, logon date/time, logoff date/time, or internet service provider (ISP) address where the user logged in from, or any combination of such data. The method 200 proceeds from step 208 to step 210. If the SIP address is not associated with any session identifiers, the method 200 proceeds from step 206 to step 210.

At step 210, the log data is queried within the analysis period using the SIP to obtain statistics for targeted network facilities. In one embodiment, the statistics include the number of events associated with the SIP address across the network elements (e.g., the report may indicate that there were X number of events reported on Y number of network facilities for the SIP address). The statistics may also include a list of identifiers for the network facilities along with a counts and percentage of events associated with each of the network facilities for the SIP (e.g., network facility A—600 events, 60%; network facility B—400 events, 40%). The statistics may also include a number of times the SIP address targeted various network facilities using a number of port/protocol combinations (e.g., the report may indicate that the SIP address targeted various network facilities Z number of times with W number of port/protocol combinations). The statistics captured at step 210 may include any combination of the aforementioned data.

At step 212, the log data is queried within the analysis period using the SIP to obtain statistics for firewall activity. For example, the statistics may include firewall activity based on port/protocol activity. (e.g., the report may indicate that the SIP address targeted various firewalls X number of times with Y number of port/protocol combinations). The firewall port/protocol activity may be separated into counts and percentages (e.g., firewall A—3 port/protocol combinations, 30%; firewall B—7 port/protocol combinations, 70%). The statistics may include firewall activity based on type of event, such as allows, drops, etc. The report may indicate that there was Z number of types of activity. The firewall type activity may be separated into counts and percentages (e.g., firewall A—100 allows, 200 drops, 30%; firewall B—400 allows, 300 drops, 70%). The percentages may be based on total number of event types or per event type. The statistics may include firewall activity based on interface (e.g., the report may indicate that activity for the SIP address was logged on W number of firewall interfaces). The firewall interface activity may be separated into counts and percentages (e.g., interface A—100 events, 33%, interface B—200 events, 66%). The statistics captured at step 212 may include any combination of the aforementioned data.

At step 214, the log data is queried within the analysis period using the SIP to obtain statistics for targeted network space. For example, the statistics may include the number of C-class networks that were targeted by the SIP address, as well as counts and percentages for individual C-class networks. As is well known in the art, C-class networks have an IP address range of 192.0.0.0 through 223.255.255.255. The report may indicate that the SIP address targeted X number of C-class networks. The report may also list the C-class networks and include corresponding counts and percentages for activity for the SIP address (e.g., network A—8 events, 80%; network B—2 events, 20%). Statistics may be gathered for other classes of networks in addition to, or as an alternative to, the C-class networks. Statistics may also be reported based on the networks in general, regardless of class (e.g., the SIP address targeted Y number of networks). The statistics may also include whether a corporate Intranet was targeted or whether a particular local subnet was targeted by the SIP address. If any such network spaces were targeted, the report may include the percent of SIP address activity (e.g., the report may indicate that the percent of activity targeting the corporate Intranet is Z %). The statistics captured at step 214 may include any combination of the aforementioned data.

At step 216, the log data is queried within the analysis period using the SIP to obtain the number of unique target IP addresses for the SIP address. At step 218, log data is queried within the analysis period using the SIP to obtain a snapshot of activity for the SIP. For example, the report may include descriptions for a predefined number of events recorded in the log data for the SIP address. At step 220, all of the captured statistics are added to the report. The method 200 ends at step 299.

Figure 3:
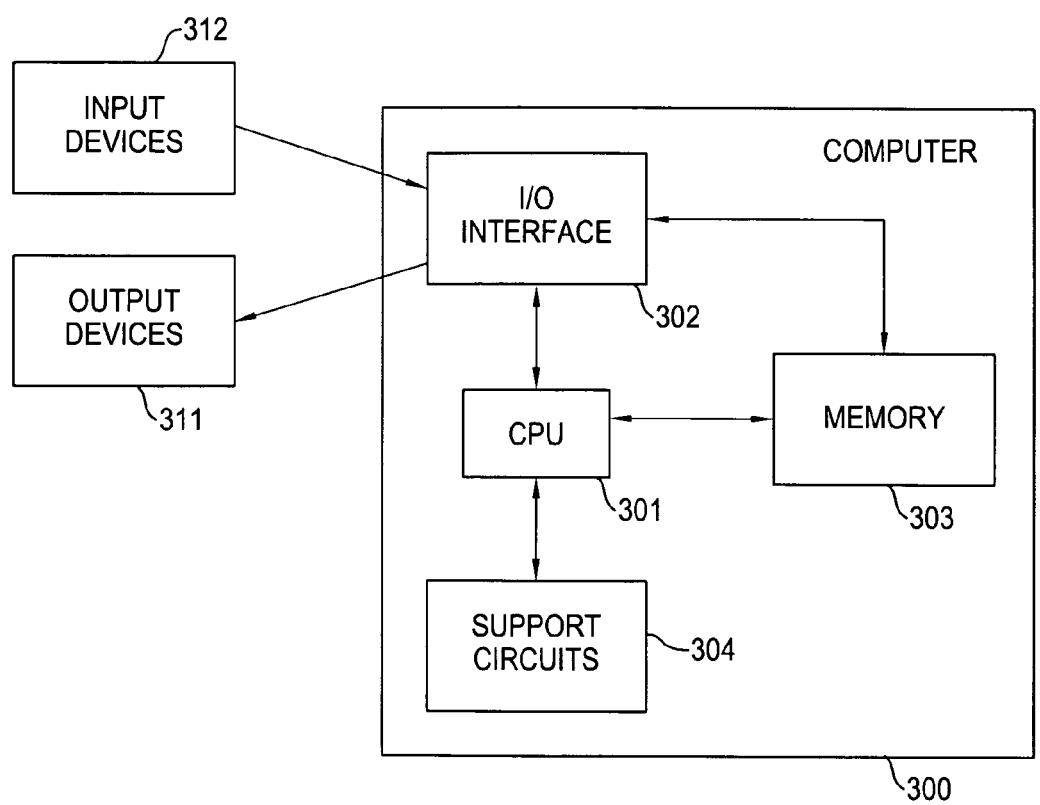
FIG. 3 is a block diagram depicting an exemplary embodiment of a computer suitable for implementing the processes and methods described herein.

FIG. 3 is a block diagram depicting an exemplary embodiment of a computer 300 suitable for implementing the processes and methods described herein. Notably, the computer 300 may be used to implement the SIP activity analyzer 112 and the method 200. The computer 300 includes a central processing unit (CPU) 301, a memory 303, various support circuits 304, and an I/O interface 302. The CPU 301 may be any type of microprocessor known in the art. The support circuits 304 for the CPU 301 include conventional cache, power supplies, clock circuits, data registers, I/O interfaces, and the like. The I/O interface 302 may be directly coupled to the memory 303 or coupled through the CPU 301. The I/O interface 302 may be coupled to various input devices 312 and output devices 311, such as a conventional keyboard, mouse, printer, and the like.

The memory 303 may store all or portions of one or more programs and/or data to implement the processes and methods described herein. Notably, the memory 303 may store program code to be executed by the CPU 301 for performing the method 200 of FIG. 2 and implement the SIP activity analyzer 112 of FIG. 1. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 300 may be programmed with an operating system, which may be OS/2, Java Virtual Machine, Linux, Solaris, Unix, Windows, Windows95, Windows98, Windows NT, Windows2000, WindowsME, and WindowsXP, among other known platforms. At least a portion of an operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of analyzing a source internet protocol (SIP) activity in a network, comprising:
obtaining a SIP address; and
automatically, via a processor, querying log data collected over a predefined time period from a plurality of network facilities using the SIP address as parametric input to generate a report having sample activity for the SIP address and statistics for targeted network facilities, firewall activity, targeted network spaces, and targeted IP addresses, wherein the statistics for the firewall activity include at least one of: statistics for firewall activity based on a protocol and port activity, statistics for firewall activity based on a type of action, or statistics for firewall activity based on an interface.

2. A method of analyzing a source internet protocol (SIP) activity in a network, comprising:
obtaining a SIP address; and
automatically, via a processor, querying log data collected over a predefined time period from a plurality of network facilities using the SIP address as parametric input to generate a report having sample activity for the SIP address and statistics for targeted network facilities, firewall activity, targeted network spaces, and targeted IP addresses, wherein the statistics for targeted network spaces include at least one of: statistics related to a C-class network space targeted by the SIP address, an indication of whether a local subnet was targeted by the SIP address, or statistics related to an Intranet space targeted by the SIP address.

3. Apparatus for analyzing a source internet protocol (SIP) activity in a network, comprising:
means for obtaining a SIP address; and
means for automatically querying log data collected over a predefined time period from a plurality of network facilities using the SIP address as parametric input to generate a report having sample activity for the SIP address and statistics for targeted network facilities, firewall activity, targeted network spaces, and targeted IP addresses, wherein the statistics for the firewall activity include at least one of: statistics for firewall activity based on a protocol and port activity, statistics for firewall activity based on a type of action, or statistics for firewall activity based on an interface.

4. Apparatus for analyzing a source internet protocol (SIP) activity in a network, comprising:
means for obtaining a SIP address; and
means for automatically querying log data collected over a predefined time period from a plurality of network facilities using the SIP address as parametric input to generate a report having sample activity for the SIP address and statistics for targeted network facilities, firewall activity, targeted network spaces, and targeted IP addresses, wherein the statistics for targeted network spaces include at least one of: statistics related to a C-class network space targeted by the SIP address, an indication of whether a local subnet was targeted by the SIP address, or statistics related to an Intranet space targeted by the SIP address.

5. A computer readable medium having stored thereon instructions that, when executed by a processor, cause the processor to perform a method of analyzing a source internet protocol (SIP) activity in a network, comprising:
obtaining a SIP address; and
automatically querying log data collected over a predefined time period from a plurality of network facilities using the SIP address as parametric input to generate a report having sample activity for the SIP address and statistics for targeted network facilities, firewall activity, targeted network spaces, and targeted IP addresses, wherein the statistics for the firewall activity include at least one of: statistics for firewall activity based on a protocol and port activity, statistics for firewall activity based on a type of action, or statistics for firewall activity based on an interface.

6. A computer readable medium having stored thereon instructions that, when executed by a processor, cause the processor to perform a method of analyzing a source internet protocol (SIP) activity in a network, comprising:
obtaining a SIP address; and
automatically querying log data collected over a predefined time period from a plurality of network facilities using the SIP address as parametric input to generate a report having sample activity for the SIP address and statistics for targeted network facilities, firewall activity, targeted network spaces, and targeted IP addresses, wherein the statistics for targeted network spaces include at least one of: statistics related to a C-class network space targeted by the SIP address, an indication of whether a local subnet was targeted by the SIP address, or statistics related to an Intranet space targeted by the SIP address.

* * * * *